(No Model.) 3 Sheets—Sheet 2.
N. W. MORTORFF.
SAW SWAGING MACHINE.
No. 419,342. Patented Jan. 14, 1890.
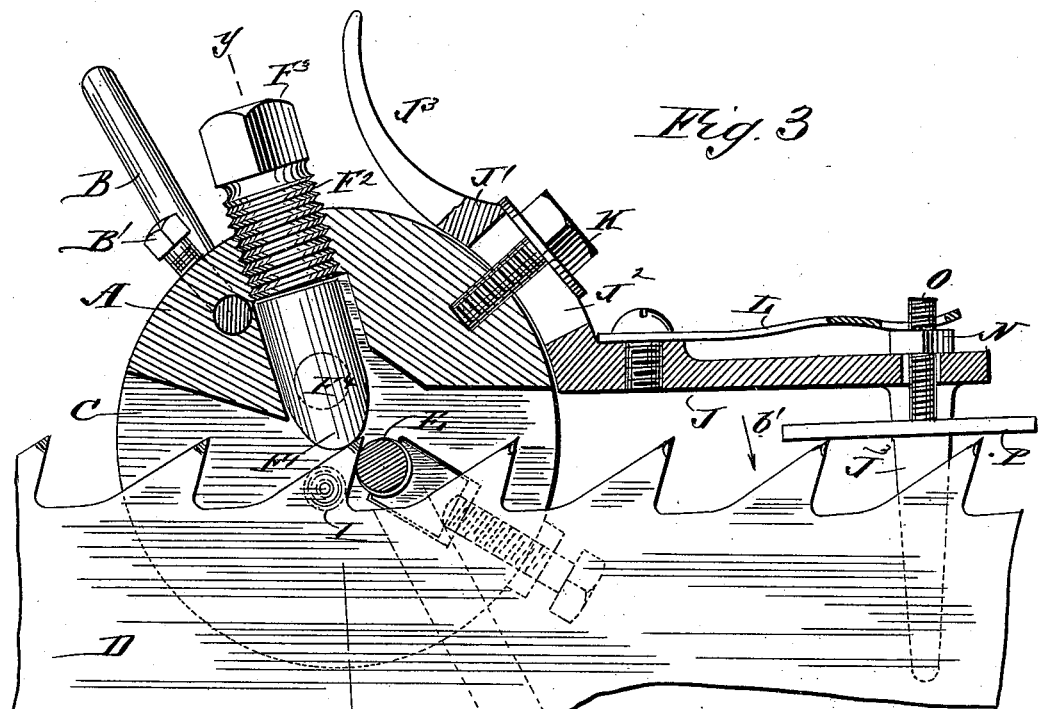
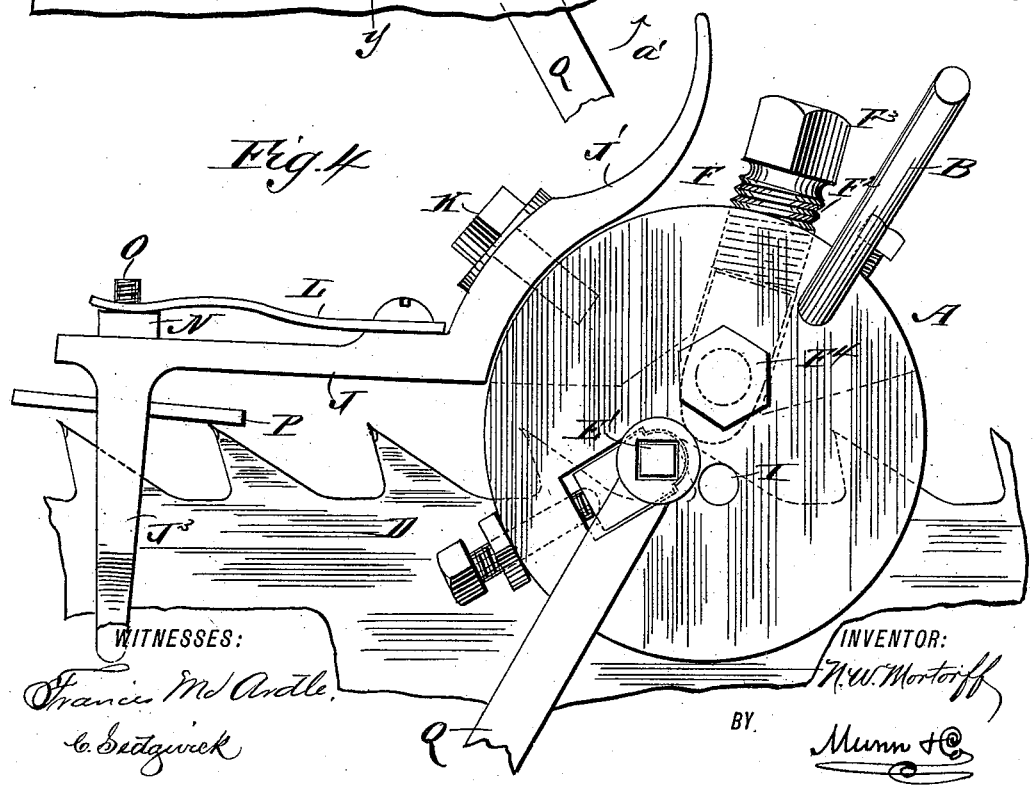
WITNESSES:
Francis McArdle
C. Sedgwick
INVENTOR:
N. W. Mortorff
BY Munn & Co.
ATTORNEYS.

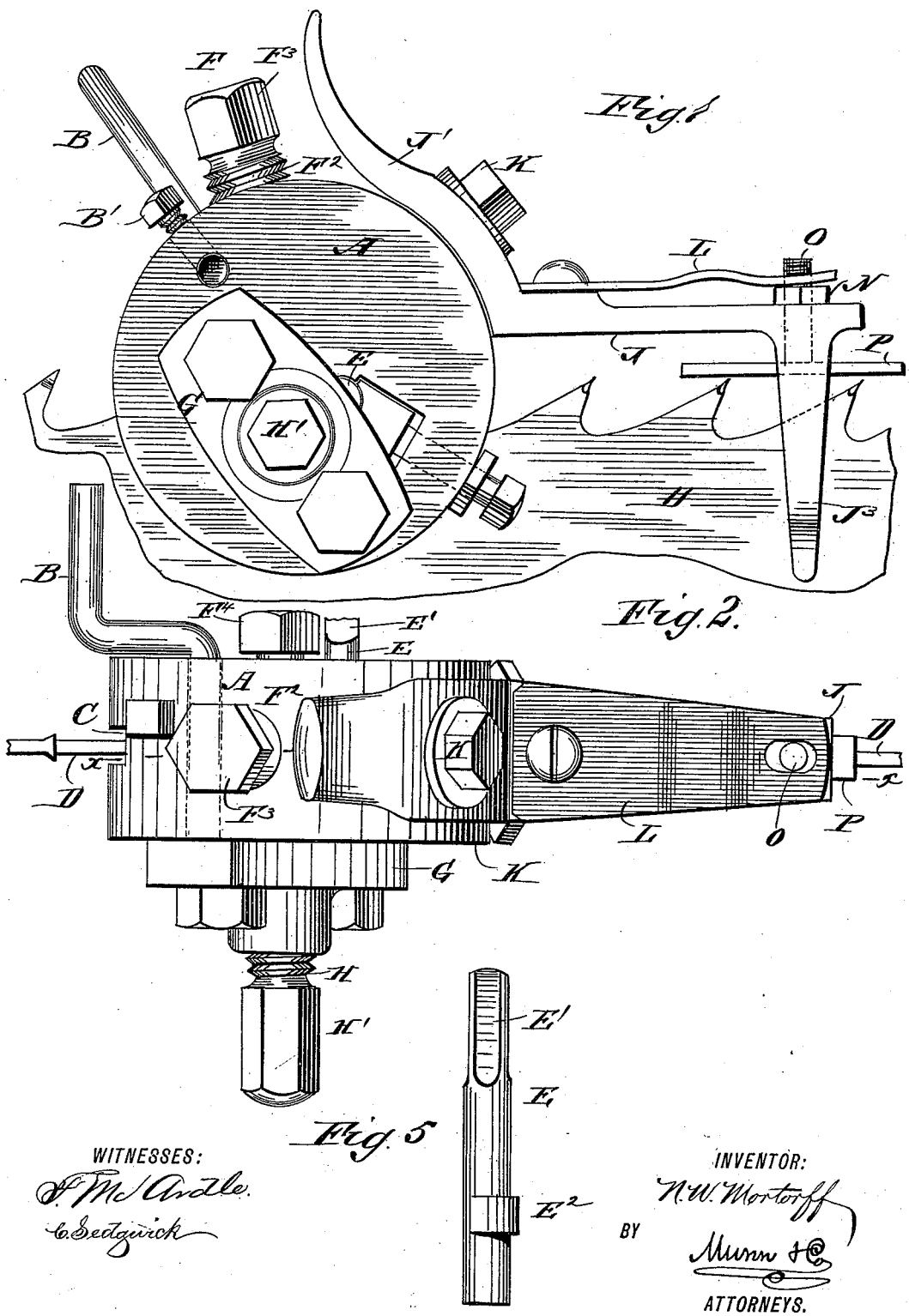

(No Model.) 3 Sheets—Sheet 3.
N. W. MORTORFF.
SAW SWAGING MACHINE.
No. 419,342. Patented Jan. 14, 1890.
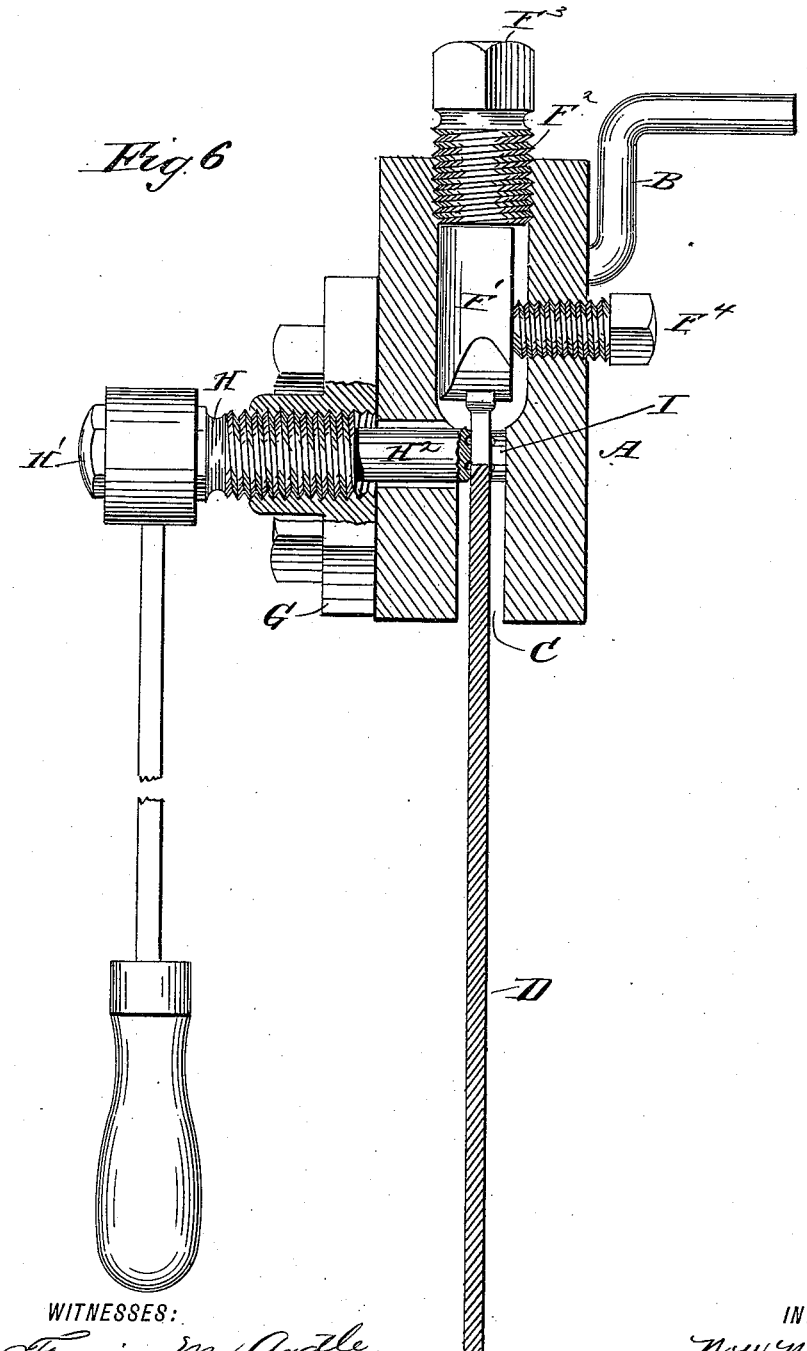
WITNESSES:
Francis McArdle
C. Sedgwick
INVENTOR:
N. W. Mortorff
BY Munn & Co
ATTORNEYS.

UNITED STATES PATENT OFFICE.

NOAH W. MORTORFF, OF JENNINGS, MICHIGAN.

SAW-SWAGING MACHINE.

SPECIFICATION forming part of Letters Patent No. 419,342, dated January 14, 1890.

Application filed June 10, 1889. Serial No. 313,777. (No model.)

*To all whom it may concern:*

Be it known that I, NOAH W. MORTORFF, of Jennings, in the county of Missaukee and State of Michigan, have invented a new and Improved Saw-Swaging Machine, of which the following is a full, clear, and exact description.

The object of the invention is to provide a new and improved saw-swaging machine which is simple and durable in construction and very effective in operation.

The invention consists of an eccentric die mounted to turn, and of a yieldingly-mounted swage-block.

The invention also consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a plan view of the same. Fig. 3 is a sectional side elevation of the improvement on the line $x\ x$ of Fig. 2. Fig. 4 is a rear side elevation of the same. Fig. 5 is a plan view of the eccentric die, and Fig. 6 is a transverse section of the improvement on the line $y\ y$ of Fig. 3.

The improved saw-swaging machine is provided with a swage-block A, carrying an adjustable stop-rod B, secured in any desired position on the block A by a set-screw B'. The swage-block A is preferably made circular in form, and is provided on its under side with a longitudinally-extending slot C, through which passes the toothed part of the saw D to be swaged.

In the swage-block A is mounted to turn a transversely-extending die E, passing through the slot C, and provided on this part with an eccentric $E^2$. One outer end E' of the die E is square, and is adapted to receive a suitable handle for conveniently turning the die E.
Into the slot C projects the lower rounded-off end F' of the anvil-die F, formed in the shape of a pin, on the upper end of which abuts the end of a screw $F^2$, screwing in the top of the swage-block A, and extending radially from the same in line with the die F. The lower rounded-off end F' is next to the eccentric part $E^2$ of the revolving die E.

On the extreme outer end of the screw $F^2$ is formed a square offset $F^3$, adapted to be engaged by a wrench or other device for turning the screw so as to adjust the die F with regard to the relation of its lower end F' to the eccentric die E. When the adjustment of the anvil-die has been made, the latter is secured in place in the swage-block A by a set-screw $F^4$, screwing in one side of the block A and against the die F. (See Figs. 3 and 6.)

On one side of the swage-block A is secured a nut G, in which screws a bolt H, provided on its outer end with a head H', adapted to be engaged by a suitable wrench or crank-arm for turning said bolt quickly into or out of the nut G. The inner end $H^2$ of the bolt H is slightly reduced and passes through an aperture in the swage-block A into the slot C. Directly opposite the screw H is held a fixed pin I, secured in the opposite side of the swage-block A and projecting slightly into the slot C. Between the pin I and the reduced end $H^2$ of the bolt H the saw D is passed, and is locked in place when the screw H is screwed inward. (See Fig. 6.)

From the periphery of the swage-block A extends horizontally an arm J, provided with a segmental offset J', having a slot $J^2$, through which passes a set-screw K, screwing in the swage-block A so as to secure the said arm J to the swage-block. The slot $J^2$ serves to adjust the arm J to any desired position on the swage-block. On the arm J is secured one end of a spring L, the free end of which presses on top of a nut N, screwing on a screw-rod O, passing through a suitable aperture in the outer end of the arm J and carrying on its lower end a horizontally-extending plate P, adapted to rest on the successive teeth of the saw D. From the front end of the arm J also extend downward the arms $J^3$, located opposite each other, and between which passes the saw-blade D.

The operation is as follows: The swage-block A is carried by the operator and is applied to the saw D, which is clamped in position by suitable means, the teeth of the saw extending upward into the slot C of the swage-block. The plate P then rests over two or more successive teeth of the saw D, and the swage is moved so that the tooth to be swaged rests at its front edge against the die E when held in the position shown in Fig. 3—that is, the eccentric part being opposite the tooth to be operated on. The anvil-die F is set to the desired position and presses against the back of the tooth with its rounded end F', as shown in Fig. 3. The operator then turns the screw H inward, so that the tooth to be swaged is clamped between the fixed pin I and the reduced end $H^2$ of the screw H. The operator now turns the crank-arm or wrench Q, engaging the outer square end E' of the eccentric die E in the direction of the arrow $a'$. This motion of the crank-arm Q turns the eccentric die E, so that the eccentric part $E^2$ of the said die presses against the point of the tooth of the saw, whereby the back of the saw-tooth is firmly pressed against the rounded end F' of the anvil-die F. When the eccentric part $E^2$ of the die E moves over the saw-tooth, the latter is pressed sidewise on the back as well as on the front edge, on account of the contact of the tooth-point with the rounded end F' and the eccentric part $E^2$ of the die E. When the eccentric part $E^2$ of the die E presses toward the point of the tooth and against the rounded end F' of the die F, the swage-block A tends to turn in the direction of the arrow $b'$, whereby the arm J moves downward from the spring L, so that the tooth-plate P yields and the swage-block A turns slightly in the direction of the arrow $b'$, thereby allowing the anvil-die to press with its rounded end F' firmly on the back of the tooth. The advantage of this form is that as both dies F and E are round and both move at the same time they cause the steel to spread more evenly than if only one die moved. It is to be understood that the eccentric die E is turned in its bearings, while the other die F moves when the eccentric die is turned with the swage-block A, as before described. As soon as the tooth is swaged the operator moves the screw-rod H outward and at the same time returns the eccentric die E to the position shown in Fig. 3. The swage-block is then moved so that the next following tooth is placed between the anvil-die F and the eccentric die E, as before described. The above-described operation is then repeated.

The rod B serves as a stop for the lever Q, which turns the eccentric die E so that the latter is always in the proper position in relation to the anvil-die F when the swage is clamped to the saw, as above described.

Having thus fully described my invention, I claim as new and desire to secure by Letters Patent—

1. In a saw-swaging machine, the combination, with a swage-block having a longitudinally-extending slot, of an eccentric die mounted to turn in the said swage-block, an anvil-die held adjustably in the said swage-block, an arm projecting from the said swage-block, and a spring-pressed tooth-plate held on the said arm, substantially as shown and described.

2. In a saw-swaging machine, the combination, with a swage-block having a longitudinally-extending slot, of an eccentric die mounted to turn in the said swage-block, an anvil-die held adjustably in the said swage-block, an arm projecting from the said swage-block, a spring-pressed tooth-plate held on the said arm, and a clamping device, substantially as shown and described.

NOAH W. MORTORFF.

Witnesses:
HOWARD OWENS,
WILLARD J. TURNER.